B. P. HOCKMAN.
SMOKE CONDENSER.
APPLICATION FILED APR. 6, 1907.
906,423.
Patented Dec. 8, 1908.
3 SHEETS—SHEET 1.
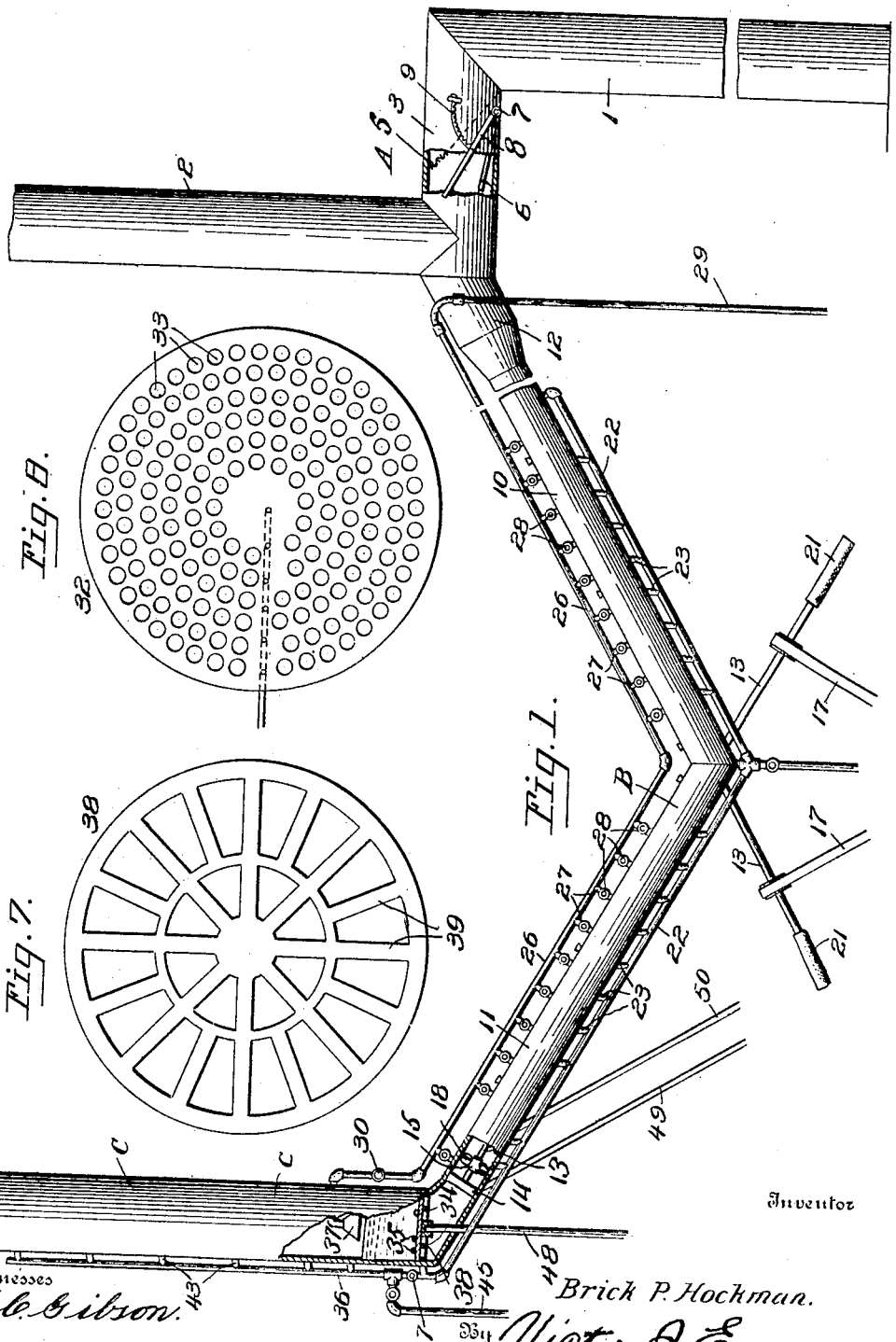
Witnesses
F. C. Gibson.
C. Bradway.
Inventor
Brick P. Hockman.
By Victor J. Evans
Attorney

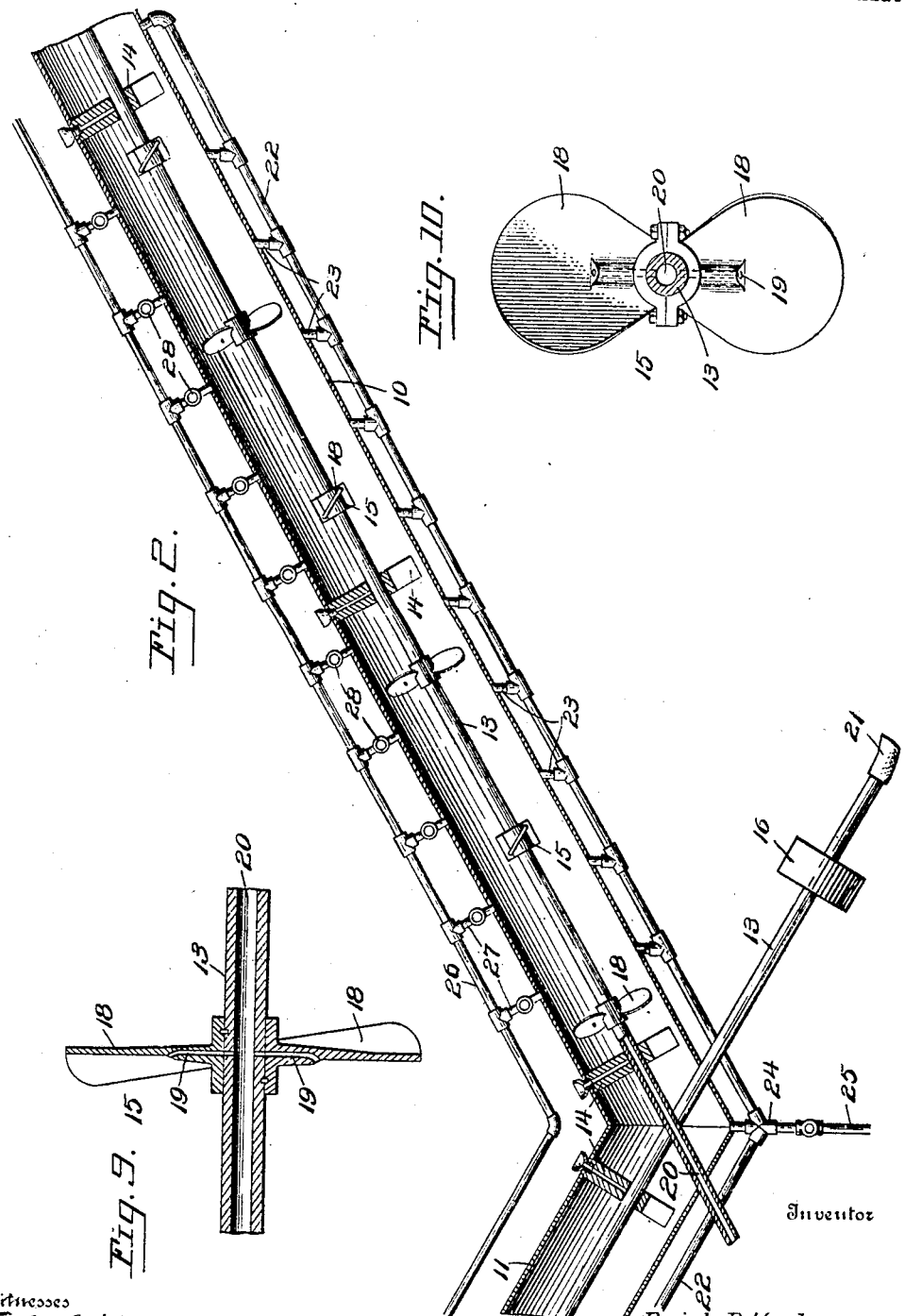

B. P. HOCKMAN.
SMOKE CONDENSER.
APPLICATION FILED APR. 6, 1907.
906,423.
Patented Dec. 8, 1908.
3 SHEETS—SHEET 3.
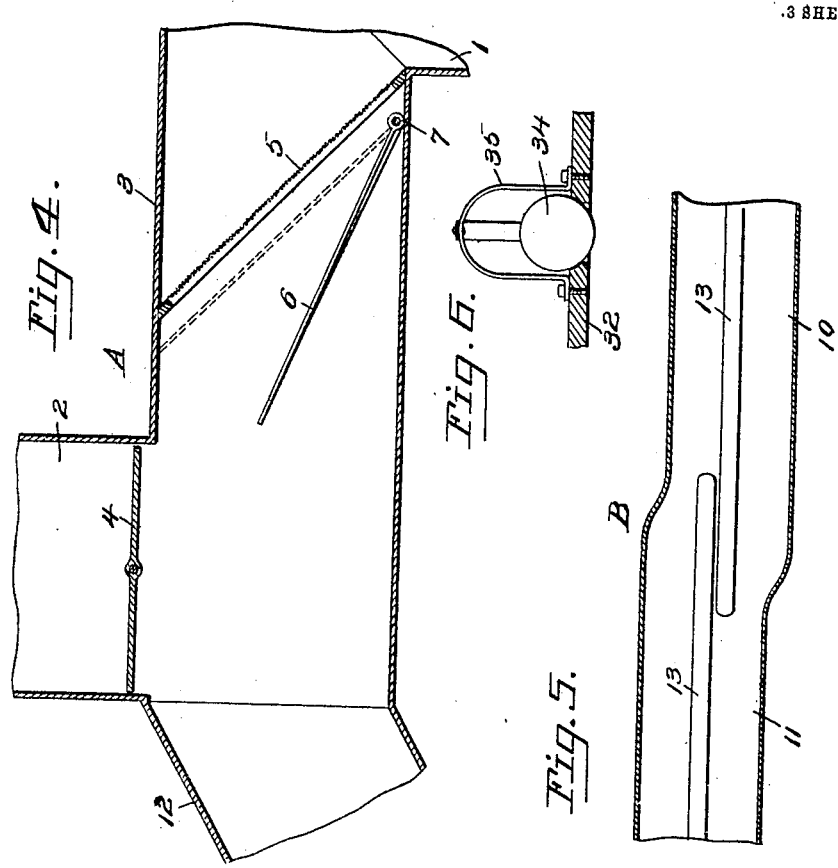
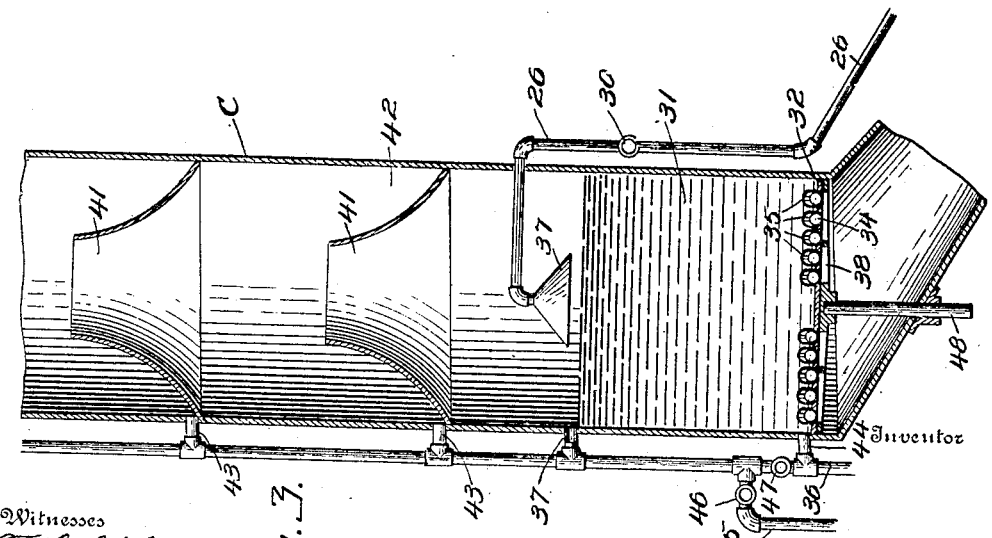
Witnesses
F. C. Gibson.
C. Bradway.
Inventor
Brick P. Hockman.
By Victor J. Evans
Attorney

UNITED STATES PATENT OFFICE.

BRICK P. HOCKMAN, OF BURBANK, UTAH, ASSIGNOR OF ONE-HALF TO ARTHUR BREWSTER, OF BLACKROCK, UTAH.

SMOKE-CONDENSER.

No. 906,423.  Specification of Letters Patent.  Patented Dec. 8, 1908.

Application filed April 6, 1907. Serial No. 366,808.

*To all whom it may concern:*

Be it known that I, BRICK P. HOCKMAN, a citizen of the United States, residing at Burbank, in the county of Millard and State of Utah, have invented new and useful Improvements in Smoke-Condensers, of which the following is a specification.

This invention relates to smoke condensers of that type in which the smoke is passed through a duct in which water is sprayed for a preliminary abstracting of the solid particles of the smoke, thence through a reservoir or tank of water for further separating the solid particles of the smoke and then through a stack provided with collectors for still further collecting the smoke particles so that by the time that the point of final exhaust is reached, practically all of the smoke particles will be separated from the gases from the furnace to which the apparatus is applied, thus obviating the serious injury to vegetation, menace to health and other objections common with furnaces as ordinarily operated.

The invention has for one of its objects to provide a smoke condenser of this character which is of comparatively simple and inexpensive construction and composed of few parts so arranged that the apparatus is capable of thoroughly condensing the smoke and at the same time producing a strong draft on the furnace to which the apparatus is attached.

A still further object of the invention is the provision of a smoke condensing apparatus which is applicable to smelting or other furnaces of new or old construction and which is thoroughly reliable and efficient in operation and capable of being readily controlled both as to the regulation of the draft and the degree of condensing smoke particles.

A still further object is the employment of an approximately V-shaped duct through which the smoke is conducted and in which are mounted a plurality of fans which serve to spray liquid into the duct for condensing smoke particles and for producing a draft through the duct and smoke stack, the said duct being provided with auxiliary means for supplying liquid for condensing purposes and with a drainage system for conducting off the mixture of liquid and collected smoke particles to a suitable settling tank.

Another object of the invention is the provision of a simple and effective means for holding a body of water or other suitable liquids in the stack through which the partially condensed smoke is passed for further condensing the smoke particles.

With these objects in view and others as will appear as the description proceeds, the invention comprises the various novel features of construction and arrangement of parts, which will be more fully described hereinafter and set forth with particularity in the claims appended hereto.

In the accompanying drawings which illustrate one of the embodiments of the invention: Figure 1 is a side elevation of the smoke condensing apparatus with intermittent portions of the furnace chimney and smoke duct broken away. Fig. 2 is an enlarged longitudinal sectional view of a portion of a smoke condensing duct. Fig. 3 is a central longitudinal sectional view of the smoke condensing tank in the stack of the apparatus. Fig. 4 is an enlarged sectional view of the connection between the smoke duct and furnace stack, showing the damper arrangement. Fig. 5 is a sectional view of a portion of a smoke duct showing the relation of the fan carrying shafts therein. Fig. 6 is an enlarged sectional view of one of the ball valves through which the furnace gases and smoke pass into the smoke condensing tank of the stack. Fig. 7 is a plan view of the rotary valve located at the bottom of the tank for causing the furnace gases and smoke to enter the tank intermittently at rapid intervals. Fig. 8 is a plan view of the disk forming the bottom of the smoke consuming tank. Fig. 9 is an enlarged sectional view of one of the fans showing the water spraying means. Fig. 10 is a transverse section of the fan carrying shaft showing one of the fans in elevation.

Similar reference characters are employed to designate similar parts throughout the several views.

Referring to the drawings, A designates the smoke stack of a furnace to which the smoke condenser is attached. The stack A is of any suitable construction and size and comprising a lower vertical section 1 and an upper section 2, open to the atmosphere at its upper end and off-set and connected with the section 1 by a horizontal connection 3. Normal communication between the upper section 2 and the horizontal portion 3 is closed by a damper 4, as shown in Fig. 4, so as to direct the furnace gases and smoke into the smoke condenser. In the horizontal portion 3 of the stack A is an inclined screen 5 having its lower end coincident with the lower section 1, so that the large particles of carbon or other matter carried with the furnace gases will be separated and dropped back into the lower section, to be further consumed or collected. At one side of the screen 5 is a damper 6, hinged at its lower end on a horizontal shaft 7, which latter projects exterior to the stack where it is equipped with an adjusting lever 8, a suitable locking means designated by 9 being provided for holding the lever in any desired position. By operating the lever 8, the valve or damper 6 is adjusted for the purpose of varying the draft through the apparatus.

The smoke condenser comprises a smoke condensing duct designated generally by B, connected at one end with the chimney A and provided with a smoke condensing stack C, at the opposite ends. The duct B is composed of porcelain-lined pipes 10 and 11 of suitable diameters and lengths and arranged in oppositely inclined relation in the form of a broad V, the angle of inclination being preferably about 30° to the horizontal. This form is preferable for the purpose of affording proper drainage of the condensing liquid that is used for collecting the smoke particles from the furnace gases as they pass through the duct. The upper end of the pipe 10 is connected with the horizontal portion 3 of the stack A by a connection 12, which tapers to the diameter of the pipe 10.

In each pipe forming the smoke condensing ducts B is a hollow rotatable shaft 13, mounted in bearings 14, as shown, in Fig. 2, the shafts 13 being slightly offset from the centers of their respective pipes so that they cross, as shown. On the shafts 13 are arranged suitable spaced fans 15 of any desired size and shape. The shafts are extended at their lower ends exterior to the duct B and are provided with pulleys 16 that are connected with a suitable motor by belts 17, Figs. 1 and 2, whereby the fans are rotated to produce a suction through the chimney A and ducts B and force the furnace gases and uncondensed smoke through the stack C. The fans 15 in the present instance, are in the form of propellers and the blades 18 thereof as shown in Figs. 9 and 10 are provided with radial passages 19, which open at their outer ends in the direction in which the furnace gases and smoke flow through the ducts B. These passages communicate with the bores 20 of the shaft 13 to receive a condensing liquid, such as water therefrom. The lower ends of the shafts 13 are connected in any suitable manner, as for instance by flexible tubular connections 21, Fig. 1, with a source of water supply under pressure so that the water flows upwardly through the shafts and discharges from the passages 19.

The shafts are driven at a high speed and the fans cause the water to be discharged from the passages 19 in the form of a spray whereby the water intimately mixes with the furnace gases and smoke and wets the solid particles of the latter, whereupon they drop upon the bottom of the pipes.

Under the pipes 10 and 11 and disposed parallel therewith, are drainage conduits 22 connected at various points by a plurality of short connections 23 with the pipes 10 and 11, so as to conduct away from the duct the water and collected smoke particles. The two inclined ducts 22 are united by a connection 24 with a common drain pipe 25 that leads to a suitable settling tank wherein the particles separate from the water to enable the latter to be used over again. The drain pipe 25 is connected with the duct B at its lowermost point so as to drain off the condensed smoke and water. To assist in the condensing of the smoke passing through the duct B, a water supply pipe 26 passes along the upper side of the duct and from this pipe water passes into the duct there being numerous short connections 27 that may be provided with valves 28, as shown in Fig. 1, for regulating the quantity of water supplied in this manner to the duct. The water supply pipe 26 is connected at one end with a vertical pipe 29, leading from a suitable source and at the opposite end the supply pipe 26 leads into the stack C for maintaining the supply of the water in the reservoir or tank thereof, a valve 30 being provided for controlling the flow of water into the tank.

The stack C is a cylindrical structure of suitable diameter and length, the bottom thereof constituting a tank or reservoir for holding a body of water designated by 31, Fig. 3. The bottom of the tank is a horizontal disk 32, which as shown in Figs. 3 and 8, is provided with a plurality of circular ports 33 which are counter-sunk on the upper side of the disk to form seats for the spherical or ball valves 34, as clearly shown in Fig. 6. Over each port is a cage constructed of inverted U-shaped strips 35, disposed at right angles and bolted to the partition or disk 32 so as to hold the ball valves in operative relation. When these valves are seated a perfect seal is formed so that the water can not leak out of the stack. These valves are unseated by the pressure produced by the fans 15. Since this pressure is sufficient to unseat the valve, it is obvious that the water is prevented from leaking through the ports by this pressure, thus the furnace gases and uncondensed smoke can be forced upwardly through the body of water 31 for further condensing the smoke. This water can be changed by permitting it to drain off through a drain pipe 36 connected with the lower end of the stack and the renewal of the water is provided through the water supply pipe 26 that has a distributer 37, as shown in Fig. 3, and the level of the water is prevented from rising too high by a drain outlet 37 connected with the pipe 36. Under the disk 32 is a rotary structure 38, Figs. 3 and 7, that is provided with a plurality of openings, and as this rotates, certain of the ports 33 in the disk 32 will be closed so that the valve 34 will drop and remain closed as long as the ports are covered by the ribs 39 of the structure 38. It will thus be seen that the valves 34 are repeatedly raised and lowered by the cutting off and an opening of the pressure of the gas and smoke by the rotation of the valve structure 38. By this constant movement of the valves 34, the adhering of the matter settling on the valves is effectively prevented, thus insuring proper seating thereof when the apparatus is idle for any cause.

Above the body of water in the stack C are spaced inverted funnels 41 through which the uncondensed smoke passes upwardly and these funnels are so shaped as to cause the furnace gases and uncondensed smoke to turn outwardly and downwardly from their upper ends, thus giving the smoke particles a chance to settle in the annular basin or space 42 around the funnels. The funnels are slightly inclined so that the smoke particles will pass to the lowest points and at these points are outlet connections 43 that lead to the drain pipe 36 that is continued upwardly along the stack C. Between the drain connection 44 and overflow connection 37, Fig. 3, is connected a pipe 45 which may be permanently opened and conduct the overflow of water and smoke particles from the funnels to the settling tank to which the drain pipe 25 is connected. This pipe 45 is controlled by a valve 46 and the drain pipe 36 is provided with a valve 47 that is located above the drain connection 44. The rotary valve 38 is attached to the upper end of the vertical shaft 48 that may be driven from the same motor that operates the fan carrying shafts, as will be readily understood.

From the foregoing description taken in connection with the accompanying drawings, the advantages of the construction and of the method of operation will be readily appreciated by those skilled in the art to which the invention pertains.

In order to assist in creating a draft through the apparatus, steam under suitable pressure or compressed air may be employed for this purpose and steam pipe 49 and compressed air pipe 50 connect with the discharge end of the duct B for delivering steam or air thereto.

In practice the furnace gases and smoke pass upwardly through the lower portion of the stack A into the smoke condensing duct B, the larger particles carried with the furnace gases being separated by the screen 5. The shafts 13 are rotated at a high speed, and fans 15 are thus caused to produce a strong draft in the apparatus and since water is supplied to the shafts the fans also discharge sprays of water into the smoke and gases, passing through the duct. This spray of water wets the smoke particles so that they settle in the duct and pass off through the drainage system with the water. This smoke condensing duct constitutes the main condensing means of the apparatus and the furnace gases and unconsumed smoke passes from the duct into the body of water continued in the tank or lower portion of the smoke stack C whereby the smoke is further condensed. Thus this tank forms a secondary condensing means. After passing through the water the furnace gases and remaining portion of the uncondensed smoke flow through the funnels 41 which operate to further separate the further smoke particles and thus serve as tertiary condensing means. By the time the gases have passed through all these funnels, the smoke particles are practically all condensed.

I have described the principle of operation of the invention together with the apparatus which I now consider the best embodiment thereof but I desire to have it understood that the apparatus shown is merely illustrative and that various changes may be made when desired as are within the scope of the claims.

What I claim as new is:—

1. The combination of a smoke stack having upper and lower sections, a duct connected with the stack at points intermediate the sections and arranged with its middle below the level of the extremities, means in the stack for closing the upper section and directing the flue gases into the duct, an upright stack connected with the end of the duct, means located wholly within the duct for creating a draft therethrough, a perforated diaphragm in the bottom of the second stack through which the flue gases are forced from the duct, valves mounted on the diaphragm for closing the perforations thereof and arranged to be opened by the force of the draft, a movable element arranged under the diaphragm for cutting off the draft intermittently from the valves, means for discharging water in the form of a spray into the duct through substantially the whole length thereof, and a drainage system connected with the bottom side of the duct at numerous points.

2. The combination of a smoke stack having upper and lower sections, a duct connected with the stack at points intermediate the sections and arranged with its middle below the level of the extremities, means in the stack for closing the upper section and directing the flue gases into the duct, an upright stack connected with the end of the duct, means located wholly within the duct for creating a draft therethrough, a perforated diaphragm in the bottom of the second stack through which the flue gases are forced from the duct, valves mounted on the diaphragm for closing the perforations thereof and arranged to be opened by the force of the draft, a movable element arranged under the diaphragm for cutting off the draft intermittently from the valves, means for discharging water in the form of a spray into the duct through substantially the whole length thereof, a drainage system connected with the bottom side of the duct at numerous points, and a water supply pipe disposed over the duct, and a plurality of valved connections between the pipe and top of the duct for discharging water into the latter.

3. The combination of a smoke stack, a duct connected with the smoke stack at a point intermediate the ends thereof and having its middle disposed below the end, controllable means in the stack for permitting the fire gases to pass to the atmosphere through the stack or to be directed into the duct, shafts mounted in the duct, fans on the shaft arranged in spaced relation for creating a draft therethrough, means on the fan for spraying liquid in the duct, means for conveying liquid to the fans, a drain pipe having branches extending under the duct, connections between the branches and duct through which the water drains to said pipe branches, a stack secured to the discharge end of the duct and rising threrefrom, a perforated plate disposed in the bottom of the tank, valves for closing the perforations of the plate and coöperating with the latter to hold a body of water in the stack, means controlling the draft through the plate to permit the valves to move intermittently, and means for draining the water from the second stack.

4. The combination of a smoke stack, a duct connected with the smoke stack at a point intermediate the ends thereof and having its middle disposed below the end, controllable means in the stack for permitting the fire gases to pass to the atmosphere through the stack or to be directed into the duct, shafts mounted in the duct, fans on the shaft arranged in spaced relation for creating a draft therethrough, means on the fan for spraying liquid in the duct, means for conveying liquid to the fans, a drain pipe having branches extending under the duct, connections between the branches and duct through which the water drains to said pipe branches, a stack secured to the discharge end of the duct and rising therefrom, a perforated plate disposed in the bottom of the tank, valves for closing the perforations of the plate and coöperating with the latter to hold a body of water in the stack, means controlling the draft through the plate to permit the valves to move intermittently, means for draining the water from the second stack, and means in the second stack for further separating smoke particles from the gases after the latter pass through the water.

5. In a smoke separating apparatus, the combination of a vertically-extending stack, means for delivering fire gases into the bottom thereof, a ported partition fitted in the stack and through which the fire gases pass, a rotary ported member disposed under and in contact with the partition, a shaft extending outside of the stack and connected with the said member for rotating the latter, and valves arranged to close the ports to hold water in the stack above the partition.

6. In a smoke separating apparatus, the combination of a vertically-extending stack, means for delivering fire gases into the bottom thereof, a ported partition fitted in the stack and through which the fire gases pass, a rotary ported member disposed under and in contact with the partition, a shaft extending outside of the stack and connected with the said member for rotating the latter, valves arranged to close the ports to hold water in the stack above the partition, and a water spraying device supported in the stack at a point above the partition.

7. In an apparatus of the class described, the combination of a main condensing and draft producing means, with a secondary means comprising a body of water, and a device for controlling the passage of the uncondensed smoke from the first means into the body of water, said device comprising a ported partition, valves in the top of the partition for closing all the ports, an element under the partition for closing some of the ports, and means for mounting the said element for relative movement.

8. In an apparatus of the class described, the combination of a hollow structure, a horizontal ported partition therein, bodily movable valves disposed above the partition and arranged to close the ports for holding a body of liquid in the structure, means for discharging flue gases through the ports under pressure sufficient to hold the valves open, and means movably mounted and in contact with the partition for interrupting the flow of gases through the ports intermittently to actuate the valves.

9. In an apparatus of the class described, the combination of a duct through which fire gases are discharged, a transverse partition therein provided with ports, valves disposed on the upper side of the partition for controlling the ports, a ported disk bearing against the underside of the partition and movably mounted for opening and closing the ports on the bottom side of the partition, and means for supplying water to the duct.

10. In an apparatus of the class described, the combination of a hollow structure, a stationary member therein provided with a plurality of ports, valves normally supported on the member and closing the ports to hold a body of water in the structure, means for discharging fire gases through the ports at a pressure to lift the valve and to prevent water from flowing downwardly through the ports, and a movable device under the member for periodically cutting off the pressure of the gases acting on the valves to produce a regular seating and unseating of the latter.

11. In an apparatus of the class described, the combination of a duct having its middle portion disposed below its ends, a hollow shaft disposed in each part of the duct and rotatably mounted, fans on each shaft having blades provided with water-discharging passages communicating with the hollow of the shaft, means for discharging water through the shafts, pipes disposed under the duct, spaced connections between the pipe and duct, and means simultaneously rotating the shafts.

In testimony whereof, I affix my signature in presence of two witnesses.

BRICK P. HOCKMAN.

Witnesses:
  E. M. SMITH,
  GEORGE T. SMITH.